Figure 1:
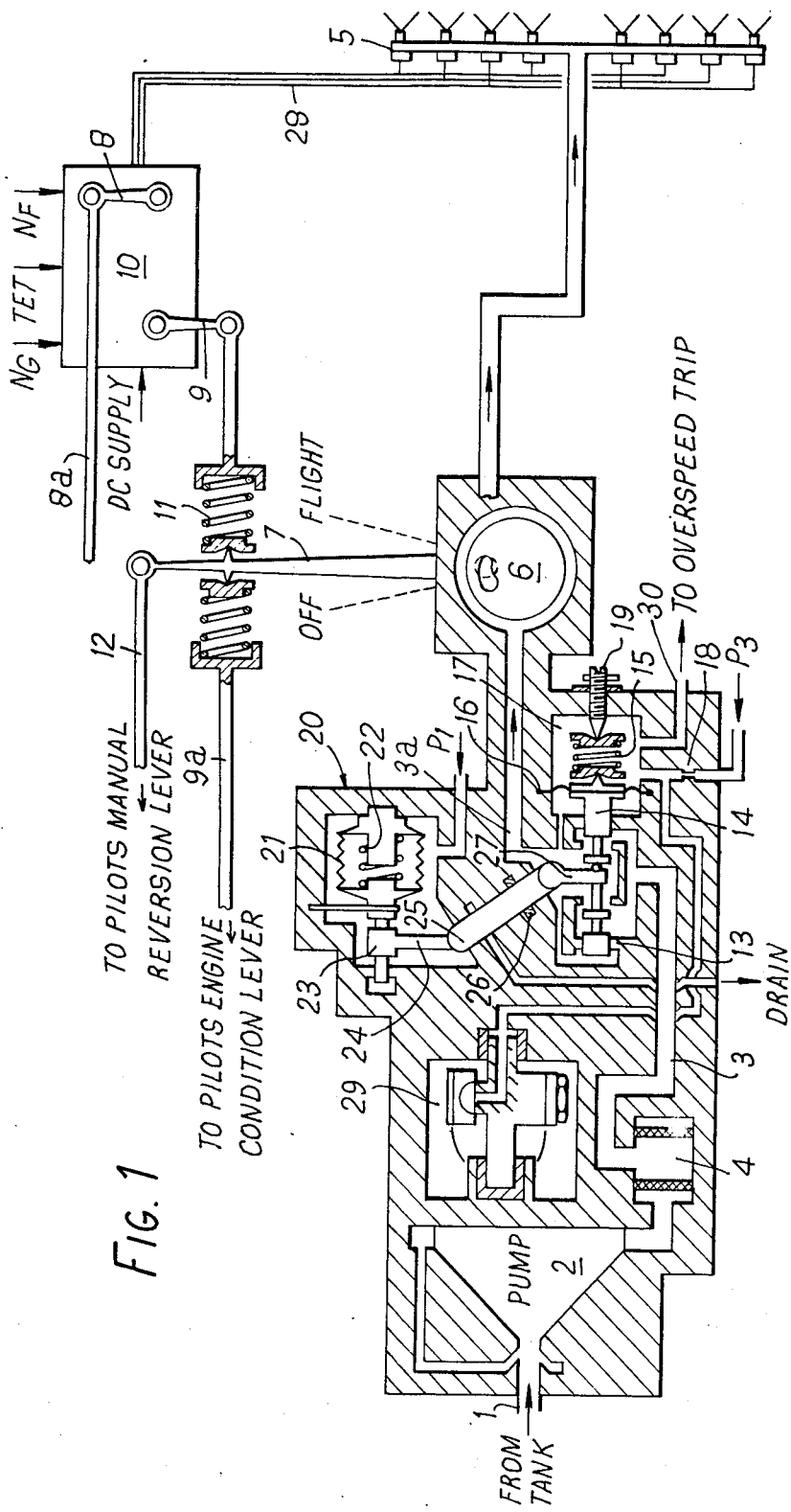

United States Patent [19]
Turner

[11] 3,938,322
[45] Feb. 17, 1976

[54] DEVICES FOR THE METERED SUPPLY OF LIQUID FUEL TO COMBUSTION ENGINES, MORE PARTICULARLY TO AIRCRAFT GAS-TURBINE ENGINES

[75] Inventor: Horace George Turner, Chandlers Ford, England

[73] Assignee: Plessey Handel und Investments, A.G., England

[22] Filed: Jan. 30, 1974

[21] Appl. No.: 438,142

[30] Foreign Application Priority Data
Feb. 15, 1973 United Kingdom........... 7469/73

[52] U.S. Cl. .................................. 60/39.28 R
[51] Int. Cl.² ..... F02C 9/08; F02C 9/10; F02C 9/06
[58] Field of Search ......................... 60/39.28 R

[56] References Cited
UNITED STATES PATENTS

| | | | |
|---|---|---|---|
| 3,195,308 | 7/1965 | McCombs | 60/39.28 R |
| 3,390,522 | 7/1968 | Whitehead | 60/39.28 R |
| 3,509,720 | 5/1970 | Warne | 60/39.28 R |
| 3,585,796 | 6/1971 | Lewis | 60/39.28 R |
| 3,600,889 | 8/1971 | Ifield | 60/39.28 R |
| 3,768,249 | 10/1973 | Lewis | 60/39.28 R |

*Primary Examiner*—Clarence R. Gordon
*Attorney, Agent, or Firm*—Scrivener, Parker Scrivener & Clarke

[57] ABSTRACT

In order to automatically adapt the control of an ultrasonic fuel-injection system or other system in which fuel delivery from nozzles is normally controlled by varying the mark/space ratio of energising current supplied to the nozzles, to variation of ambient pressure, a pressure-regulating unit is provided in a line leading from a source of fuel under pressure to the nozzles through a manually adjustable throttle valve and is arranged to maintain the pressure difference between the inlet and outlet of this series arrangement constant for any given ambient pressure P1. An altitude compensator comprising a spring-expanded vacuum capsule and a mechanical transmission is provided for varying this pressure difference in proportion to the ambient absolute pressure P1.

5 Claims, 2 Drawing Figures

DEVICES FOR THE METERED SUPPLY OF LIQUID FUEL TO COMBUSTION ENGINES, MORE PARTICULARLY TO AIRCRAFT GAS-TURBINE ENGINES

This invention relates to fuel systems of the kind hereinafter called the kind specified, for the metered supply of liquid fuel to combustion engines, and more particularly to gas-turbine engines of aircraft. A fuel system of the kind specified is a fuel system for combustion engines in which liquid fuel is supplied to the engine through injection nozzles in a rapid sequence of short, uniformly time-spaced pulses, means being provided to control the rate of fuel supply by varying the ratio of the length of these pulses in relation to the length of the intervals, this ratio being hereinafter referred-to as the mark/space ratio of the pulse sequence, and the frequency of the mark/space sequence being chosen sufficiently high to provide continuity of combustion.

Examples of fuel systems of the kind specified are described in British Patent Specification No. 1138536 (Ultrasonic Fuel Injection), and in co-pending British patent applications Nos. 32009/69, 2245/71 and 4609/72.

The invention has for an object to provide an improved fuel system of the kind specified which permits a reliable control of the rate of fuel supply in accordance with engine data to be obtained with the use of relatively simple control means.

In a fuel system of the kind specified the mark/space ratio of the operative and inoperative periods will determine the effective rate of fuel supply to the combustion chamber for any given pressure drop in the nozzle during the injection periods, and it is a more specific object of the present invention to provide improved means for controlling this pressure drop.

According to the invention the fuel system includes a flow-control device which is responsive to a pressure difference substantially equal to the pressure drop in the injection nozzle or nozzles, or substantially equal to the sum of the pressure drop in the said nozzle or nozzles and the pressure drop in an adjustable throttle valve connected in series with the nozzle or nozzles, the said flow-control device being operative, in response to variations of said pressure difference to neutralise the effect, upon the said pressure difference, of variations of the rate, or of the pressure, of the fuel supply to the system.

In an arrangement in which the fuel is supplied to the engine burners by a supply line containing a throttle valve, means are preferably provided which automatically control the pressure at which fuel is admitted to the throttle valve in response to variations of the difference between that pressure and a lower pressure substantially equal to the pressure in the space to which fuel is discharged by the injection nozzles. Conveniently a fuel pump is arranged to supply fuel under pressure to the inlet of the throttle valve through a regulating valve which is movable, to vary the pressure at said inlet, under the action of a displacement element acted-upon, against a preloaded spring element, by the difference between the pressure at the inlet to the throttle valve, acting on one side of the displacement element, and a lower pressure substantially equal to the pressure of the chamber into which the fuel is injected. In the case of an aircraft turbine engine the delivery pressure of the combustion-air compressor of this engine is preferably employed as the said lower pressure. Preferably means are additionally provided which exert a force proportional to compressor-intake pressure to act upon the regulating valve in the same direction as the pressure at the inlet of the throttle so as to render the pressure difference between said inlet and the space into which the fuel is discharged variable in accordance with compressor-intake pressure and thereby to reduce with increasing altitude the rate at which fuel is supplied at a given setting of the throttle valve. When fuel is supplied from a dynamic pump such as a centrifugal pump, the regulating valve is, in a known per-se manner, constructed as a throttle valve, whereas it is constructed as a spill valve when the fuel is supplied by a positive-displacement pump, for example by a gear pump.

Figure 2:
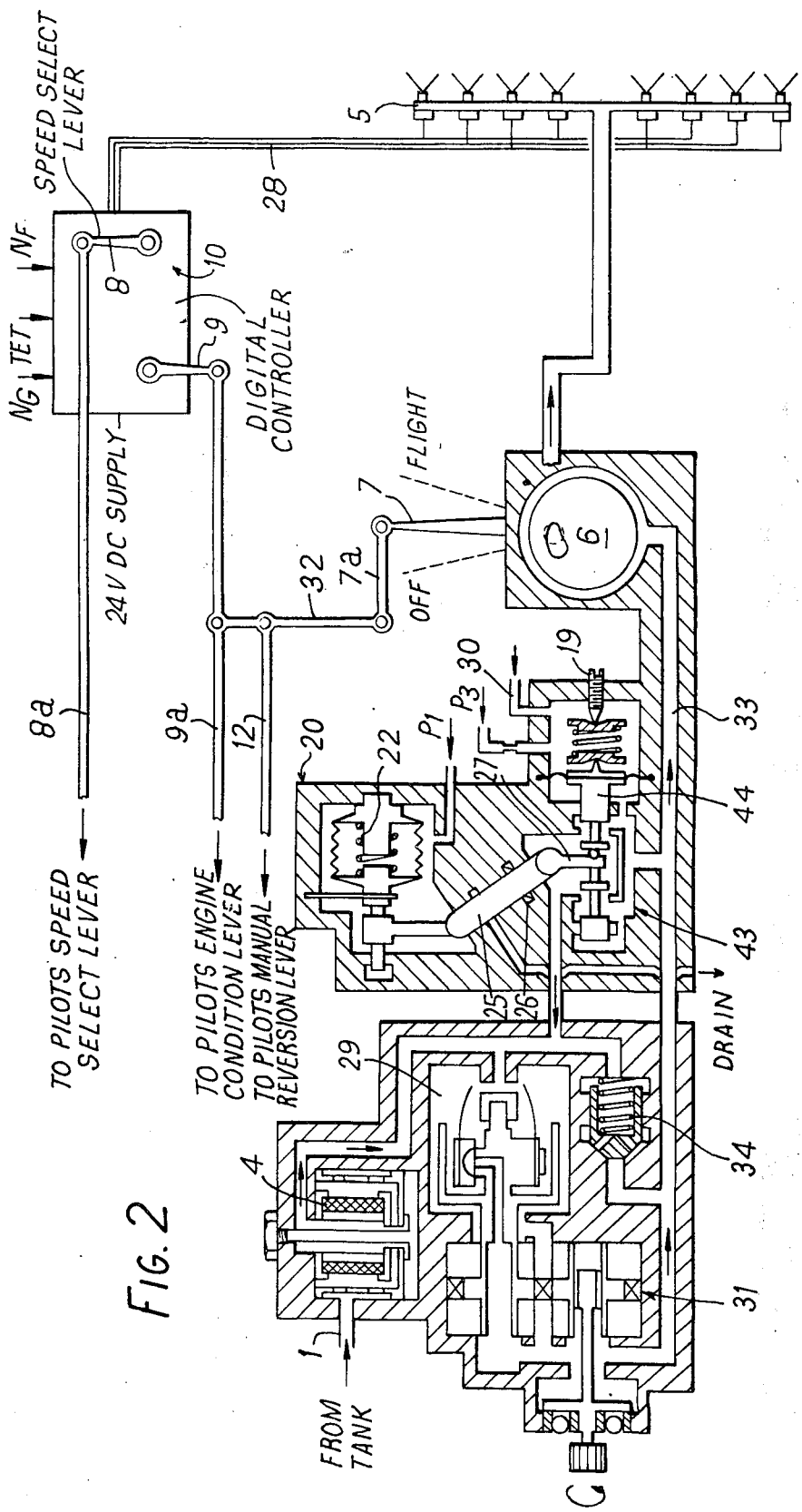

In order that the invention may be more readily understood, and to point out various advantageous subsidiary features, two embodiments of the invention will now be described with reference to the accompanying drawings, in which:

FIG. 1 is a diagrammatic layout of one embodiment of a fuel system incorporating the invention, in which a centrifugal pump, driven by the turbine of the gas-generator compressor associated with a free power-output gas turbine, is employed for supplying fuel, and FIG. 2 similarly illustrates an embodiment in which a gear pump is employed for the supply of fuel under pressure.

Referring now first to FIG. 1, fuel from a tank line 1 is admitted to a centrifugal pump 2, which is driven by the gas-generator turbine so as to rotate at a speed proportional to the turbine speed. This pump delivers fuel to a pressure line 3 containing a filter 4 and leading to injection nozzles 5, which are connected in series with a throttle-and-shut-off cock 6, which has an actuating lever 7 and constitutes a throttle valve. A pressure-regulating valve 13 is arranged in the line 3 at the entrance to a portion 3a of the latter that leads to the throttle valve 6. The pressure-regulating valve is constructed as a double-beat valve, in which pre-loaded spring 15 urges a valve element 14 towards the left-hand side of the drawing to increase the cross-section that is available for the flow of fuel past the valve element 14 from the centrifugal pump 2 towards the nozzles 5. This action of the spring 15 is assisted by the action, upon a diaphragm 16, of the pressure in a chamber 17 which, via a restrictor 18, communicates with the delivery side of the compressor driven by the gas-generator turbine so as to be normally maintained at compressor delivery pressure P3, and is opposed by the action, on the opposite side of the diaphragm 16, of the pressure at the inlet to the throttle valve 6.

The system as so far described will so regulate the flow from the pressure line 3 to the throttle valve 6 and the burner nozzles 5 as to maintain the difference between pressure at the inlet to the throttle 6 and the compressor-delivery pressure P3, and thus in practice the pressure difference between the first-mentioned pressure and the pressure in the combustion chamber or other space into which the nozzles 5 discharge the fuel, constant for any given preloading of the spring 15. This preloading can be adjusted by means of a set screw 19, thus making it possible to adapt the response to general temperature conditions, more particularly to the time of the year or to the general climatic conditions of the region of operation. By thus providing a constant pressure drop for the series connection of the throttle valve 6 and nozzles 5, the rate of fuel delivery of the system will, at any given position of the control lever 7, depend only upon the mark/space ratio of the operative periods of the nozzles 5, irrespective of variation in the speed of the engine, thus greatly facilitating the control by a digital controller 10 to which more detailed reference will be made further below.

In order to make it unnecessary for the ambient pressure or compressor-intake pressure P1 to be introduced into the controller 10, the regulating valve unit 13 is provided, according to a development of the invention, with further bias means generally indicated at 20, which are arranged to vary the pressure difference maintained by the pressure-regulating valve element 14 in accordance with the absolute value of the compressor-intake pressure P1, and which thus act as an altitude compensator. This altitude compensator 20 consists of a vacuum capsule 21 upon the outer side of which the ambient pressure P1 is arranged to act against a longitudinally-acting loading spring 22. A plunger head 23 attached to the capsule will thus move towards the left of the drawing when, with higher altitudes, the pressure P1 decreases. This plunger head 23 is arranged on one crank arm 24 of a crank spindle 25 which is rotatable in a floating bearing 26, and a second crank arm 27 of which acts upon the valve element 14 of the pressure-regulating valve 13 in such a manner as to assist the action of the pressure at the inlet to the throttle 6 by a force proportional to the ambient absolute pressure P1. The fuel-injection nozzles 5 discharge the fuel into a flow of combustion air from the engine compressor and are arranged to be operative only when energised through electric lines 28. The digital controller 10 mentioned further above is arranged to vary the mark/space ratio of this electric supply in accordance with a variety of input data.

These input data include the pilot's speed selection, which is fed into the controller 10 by a speed-select lever 8 operated by a link 8a, three automatic inputs representing respectively the speed $N_G$ of the gas-generator turbine, the speed $N_F$ of the free power-output turbine, and the temperature TET of the gases at the entrance to the turbine, and a supplementary input fed into the controller 10 by a condition lever 9, which is actuated by a link 9a from a pilot's engine-condition lever and permits the pilot to modify the control normally effected by the digital controller 10. For this purpose the link 9a is also arranged to modify, when it is actuated, the position of the throttle valve 6 with the help of a spring box 11 coupling the link 9a to the throttle-actuating lever 7. The controller 10 is so constructed that, for example, any increase in $N_G$, TET, or $N_F$ above a predetermined value will cause the mark/space ratio of energisation of the nozzles 5 to decrease, and the resulting decrease in the rate of fuel reaching the combustion chamber will counteract the undesired tendency of such increase.

It will be readily appreciated that, since at any given ambient pressure the pressure difference applied to the atomization system comprising the throttle 6 and the atomizer nozzles 5 is kept constant by the pressure-regulating unit 13, the rate of fuel supplied to the engine at that ambient pressure will be proportional to the mark/cycle ratio (i.e. mark/mark-plus-space ratio) of the digital-controller output supplied to the nozzles by the wires 28 so long as the position of the throttle valve 6 remains unaltered. On the other hand the rate of fuel supply at any given mark/cycle ratio and thus at any given mark/space ratio may be altered by moving the lever 7 to vary the position of the throttle valve 6 and thus the distribution of the total pressure drop governed by the pressure-regulating unit 13 between the throttle valve 6 and the nozzles 5. In order to ensure that, in the case of a breakdown of the digital controller 10, control of the fuel supply can be effected manually, the digital controller 10 is so constructed that in the case of failure of its control system the mark/space ratio of the outgoing pulses assumes a predetermined value, preferably at or near its maximum value, thus making it possible in such a case to effect control of the rate of fuel supply over the whole available range by manual operation of the throttle 6.

In order to prevent in these conditions over-speeding of the gas generator, the illustrated system includes an emergency governor 29 of the loaded half-ball reed-valve type, which is driven by the gas-generator turbine and controls an atmospheric outlet from the chamber 17 of the pressure-regulating unit 13. It will be readily appreciated that, at a predetermined speed of the gas generator, opening of the half-ball valve in this emergency governor 29 will cause a flow of air in the line connecting the source of compressor-delivery pressure P3 with the chamber 17 via the restrictor 18, and this flow will produce a pressure drop in this restrictor, whereby the pressure in chamber 17 and thus the pressure difference maintained in the atomizer system 6, 5 by the pressure-regulating unit 13 and, as a result of this, the fuel supply to the gas generator turbine will be correspondingly reduced.

A further connection 30 from the P3-chamber 17 of the pressure-regulating unit 13 leads to an overspeed trip associated with the free power output turbine unit. In the case of overspeeding of the latter unit, this overspeed trip, which may be of conventional construction, will reduce the pressure difference maintained in the atomizer system by the pressure-regulating unit 13 in a manner similar to that explained hereinabove in connection with the emergency governor 29.

Under normal cruising conditions of the turbine engine, when the pilot has selected the speed by setting the speed-select lever 8 via the link 8a and has effected any desired modification of the automatically established fuel supply by moving a pilot's engine-condition lever via the link 9a, the last mentioned lever is locked in position, thereby normally maintaining, via the spring box 11 and the lever 7, the throttle 6 in a fixed position. The rate of fuel supply is then exclusively determined by the co-operation of the digital controller 10 and the pressure regulating unit 13. If in these conditions the pilot finds that the engine condition thus maintained is not quite that required, he can effect a correction by releasing the locking of his engine-condition lever and altering the position of this lever and thus of the throttle 6, to which this movement of the engine condition lever is transmitted via the spring box 11. The control lever 7 is also, by a link 12, positively coupled to a pilot's manual reversion lever which enables the pilot to effect, against the resilient preloading of the spring box 11, rapidly at any time any necessary alterations of the setting of the throttle and shut-off cock 6, and more particularly to cut off the fuel supply. This reversion lever is not locked, and will therefore normally follow any movement of the engine-condition lever without appreciable resistance. In the case of a breakdown of the digital controller, when the mark/s- pace ratio of energisation of nozzles 5 is maintained at a maximum, the pilot can effect full control over the fuel supply by using the pilot's engine-condition lever to vary the setting of the throttle 6, whereafter he may lock this lever in the requisite position. In the case of an emergency, irrespective of whether the fuel control has been effected by the digital controller 10 subject to modification by the engine condition lever or has been effected by the latter only, the pilot can operate the throttle valve 6, more particularly in order to effect instant shutting-off of the fuel supply, by operating his manual reversion lever which, via the link 12, is directly attached to the actuating lever 7 of the throttle valve 6, the necessary relative movement of the control lever 7 relative to the link 9a of the pilot's engine-condition lever, which is likely to be locked in position, being permitted by the resilience of the spring box 11.

Whereas the system thus described with reference to FIG. 1 employs a dynamic pump, driven by the turbine, for pressurising the fuel supply and will therefore be able to provide the desired pressure difference across the atomizing system constituted by the series-connected throttle 6 and nozzles 5 only as long as the speed of the turbine driving the pump exceeds a predetermined minimum, FIG. 2 illustrates a modified system, in which fuel under pressure is supplied by a gear pump, which is a positive-displacement type pump and is capable as such to produce the fuel pressure necessary for maintaining a given pressure difference between inlet to the throttle 6 and the outlet of the nozzles 5 even at very low speeds of the turbine driving the pump. Those parts of this system which are identical with corresponding parts of the embodiment described with reference to FIG. 1, have been indicated in FIG. 2 by the same references so that their description need not be repeated.

Referring now to FIG. 2, the fuel arriving from the tank via line 1 is admitted to the suction side of a gear pump 31 after passing through the filter 4 and is delivered by the gear pump 31 to a line 33 which leads direct to the throttle valve 6 and, through the latter, to the injection nozzles 5, and which is equipped with a safety relief valve 34 for preventing the pressure in the line 33 from exceeding a predetermined maximum. A pressure-regulating unit 43 of similar construction as the pressure-regulating unit 13 of the FIG.-1 embodiment is provided to control a spill flow from the delivery side of the pump 31. For this purpose, it is connected at its inlet side to the pump-delivery line 33, while its outlet side is connected to the tank line 1, and its valve element 44 is so shaped and arranged that, when it moves to the left-hand side of the drawing as a result of a decrease in the pressure difference across the throttle-and-nozzle system 6, 5, the effective orifice area of the unit 43, and thus the rate of spill flow from the line 33 through the pressure-regulating unit 43 decreases, thereby tending to increase the pressure in line 33 and thus to restore the pressure difference to its desired value. The emergency governor 29 has also been so rearranged as to control spill flow from the high-pressure delivery side of the gear pump 31 to the low-pressure tank-fuel line 1 so that when the speed of the turbine driving the unit exceeds a predetermined value, resultant opening of the valve 29 causes the pressure in line 33 to be reduced as a result of spill flow through the valve 29 without requiring movement of the valve element 14 of the pressure-regulating unit 43. On the other hand, the line 30 from the overspeed trip of the free power-output turbine communicates, similarly as in FIG. 1, with the P3-pressure chamber 17 of the pressure-regulating unit 43, so that operation of the overspeed trip results in movement of the valve element 44 of the pressure-regulating unit 43 to the right-hand side of the drawing and thus in a reduction of the pressure in line 33 due to an increased spill flow through unit 43. Another modification of the embodiment of FIG. 2 compared with that of FIG. 1 consists in the manner in which the link 12 from the pilot's manual reversion lever and the link 9a from the pilot's engine-condition lever are connected to the actuating lever 7 of the throttle valve 6. The spring box 11 of FIG. 1 has been replaced by a floating lever 32 one end of which is pivoted to the link 9a actuated by the pilot's engine-condition lever, while the other end of the floating lever 32 is connected through a subsidiary link 7a to the actuating lever 7 of the throttle valve 6, the link 12 from the pilot's manual reversion lever being pivotally attached to an intermediate point of the lever 32. The pilot's manual reversion lever is, in the embodiment of FIG. 2, arranged to be normally locked in position, so that operation of the pilot's engine-condition lever causes the lever 32 to move about its pivotal connection to the reversion-lever link 12, thereby moving the actuating lever 7 of the throttle 6. When on the other hand the pilot's manual reversion lever is operated with the engine-condition lever locked in position, the floating lever 32 will move about its pivotal connection with the engine-condition lever link 9a. Thus as in the case of FIG. 1, the actuating arm 7 of the throttle 6 can be moved by the pilot's manual reversion lever without affecting the position of the pilot's engine-condition lever and the corresponding lever 9 on the digital controller 10.

It will be readily appreciated by those skilled in the art that the invention is not limited to the details of either of the embodiments described, and that, for example, the arrangements for the co-operation of the throttle control from the pilot's engine-condition lever and the pilot's reversion lever shown respectively in FIGS. 1 and 2 are interchangeable and that the choice of one or the other does not depend on whether the pump employed is of the dynamic or of the positive-displacement type.

What we claim is:

1. Apparatus for supplying a controlled amount of fuel to a gas-turbine engine of an aircraft, said gas-turbine engine having a compressor, said apparatus comprising in combination:
   1. a fuel tank for containing fuel for said engine;
   2. a pump for delivering said fuel under pressure to said engine;
   3. throttle means for enabling a pilot of said aircraft to adjust the flow of said fuel passing through said throttle means and destined for said engine;
   4. a plurality of nozzles which are electrically energisable with such a mark/space ratio of energisation that they inject fuel into said engine in a rapid sequence of short uniformly time-spaced pulses;
   5. electronic controller means for controlling said mark/space ratio of energisation of said nozzles by varying the ratio of the length of said pulses in relation to the length of the intervals between said pulses; and
   6. fuel flow control means responsive to the difference in pressure between the fuel pressure at said throttle means and delivery pressure of said compressor, said flow control means being operative to maintain this pressure difference constant whereby the rate of said fuel delivery to said engine at any given setting of said throttle means is dependent only upon said mark space ratio set by said electronic controller means.

2. Apparatus according to claim 1 in which said fuel flow control means is a spool-type valve which is biassed one way by said fuel from said pump and by intake pressure of said compressor, and which is biassed the other way by said delivery pressure of said compressor, said spool-type valve fuel flow control device being altitude sensitive by virtue of said intake pressure of said compressor being applied to said control means.

3. Apparatus according to claim 2 including two lever means, each operative to varying the degree of opening of said throttle means.

4. Apparatus according to claim 1 including an over-speed governor operative to modify said delivery pressure of said compressor acting on said fuel flow control means, thereby to reduce said rate of said fuel delivery to said engine.

5. Apparatus according to claim 1 in which said pump is a dynamic pump, and in which said fuel flow control means is positioned in the path of said fuel passing from said dynamic pump to said throttle means.

* * * * *